2,981,635
COLOR COATED ROOFING GRANULES AND METHOD OF MAKING THE SAME

James R. Lodge, St. Paul, Minn., assignor to Minnesota Mining and Manufacturing Company, St. Paul, Minn., a corporation of Delaware No Drawing. Filed June 22, 1954, Ser. No. 438,594

14 Claims. (Cl. 117—62)

This invention relates to improvements in coated granules, and more particularly, to coated granules which are substantially free of soluble salts and which are highly resistant to the deleterious effects of severe weathering. Further, this invention relates to a special process having certain critical steps performed in a significant sequence, whereby these improved granules are obtained.

Coated granules applied in a layer upon plastic backings have found extensive use as a decorative and protective, weather-resistant layer on roofing and sidings. The backing is usually comprised of a sheet of fibrous material, e.g., felts, fiberboard, etc., impregnated with a bituminous composition, e.g., pitch or asphalt, and coated on one or both sides with a similar bituminous composition, asphalt being preferred. While the asphalt coating is in a heated state, the granules are pressed therein and the composite article cooled, usually by spraying water over the surface containing the granules.

For years, efforts in this art have been bent toward obtaining attractively colored granules which exhibit desirable properties such as tenacious plastic adhesion and a lack of blooming even under the most severe atmospheric conditions conducive to blooming, conditions such as low humidity, low temperature, and the presence of such chemically reactive gases as carbon dioxide and sulfur dioxide. For the most part, blooming tendencies of coated granules have been corrected to a certain extent by methods, either chemical or physical, designed to insolubilize the coatings on the granules or to reduce the ability of soluble constituents in the coating to escape therefrom. The problem of adhesion to a plastic has been primarily attacked by employing certain organophilic compositions, such as oils, resins, certain polymers and the like, as additional coatings over the surface of the decoratively coated granules.

Here, it might be observed that several methods have been developed to coat granules with a pigment fixed in a binder matrix. For some pigments, high temperatures, above 600° F. may be employed without the pigments being changed deleteriously in the step of setting the binder matrix. For others which at high temperatures are changed in color or otherwise deteriorated, the temperature must not be raised above the point of such deleterious change. Accordingly, when these pigments are used, low temperatures have been employed in setting the binder matrices, i.e., temperatures not higher than about 600° F., and preferably not above 400° F. It is to the low temperature coating methods that this invention is particularly directed. With low temperature coating methods, the problem of soluble constitutents in the coating becomes pronounced.

Of those commercially feasible binder matrices, those based on alkali silicates have proved to be the most popular by reason of their utility, availability, and cost. The siliceous portion of these binders may be insolubilized quite readily by a process of drying at a slightly raised temperature, even on the order of 300–400° F., but the alkali flux portion, presumably present in the dried composition as some form of oxide or related structure, remains in the coating in a water soluble form even after such drying. To this alkali portion, that is, the flux portion, which serves to retain the siliceous portion of the binder in suspension during the coating step, may be attributed some of the most serious drawbacks of coated granules. Blooming tendencies are directly related to the quantity of soluble flux, usually alkali flux, in coated granules. Plastic adhesion is deleteriously affected by this and even lost under adverse conditions of fabrication of the roofing or siding products, conditions such as those encountered in cooling the product with excess amounts of water after the granules are embedded in the asphalt.

This invention overcomes the major source of trouble in low temperature coated granules by providing a coated granule which substantially lacks any water-soluble flux portion in the coating. The coated granules of this invention have an exceptional resistance to blooming and will undergo severe weathering without exhibiting this phenomena. They have a lack of hazy surfaces and an improved color permanence as evidenced after years of outdoor exposure. They are further treated in such a manner that they may be tenaciously retained on an asphalt base shingle even under adverse conditions of shingle fabrication. They have an unusually low granule displacement from asphalt, after being embedded therein, even under the most severe conditions of use and handling. In addition, they have a surprisingly low moisture pick up, which I believe, may in part be responsible for their improved asphalt adhesion properties and absence of blooming.

A process hereinafter to be more fully described, and which must be performed in a particular significant sequence in order to be fully effective, has now been found to provide artificially colored coated granules having a low temperature siliceous matrix bond and possessing substantially complete freedom from blooming while being tenaciously held by organophilic plastic compositions such as employed in the manufacture of asphalt shingles. In brief, the process includes the steps of coating base granules with a pigmented alkali silicate bonding composition, drying the coating to a rigid, abrasion-resistant state, and then subjecting the coating to an ion-exchange process, which removes soluble flux components but leaves the siliceous matrix of the binder unaffected, after which the granules are further treated, such as with a small amount of chemical pickling solutions, or otherwise acted upon to complete the preparation of the artificially colored granule product. On the other hand, any substantial change in the order in which these various steps are taken is found greatly to reduce the effectiveness of the treatment. For example, failure to substantially dry the coating on the granules to an abrasion-resistant, rigid state prior to ion exchange will result in a powdery coating upon the base granule after the ion exchange step. Again, delaying the ion exchange step until after the coated granules have been pickled will leave the coating on the granules in substantially the same state it gained during pickling. Thus the exact sequence of steps hereinabove specified must be followed in order to obtain the beneficial results here described, resulting in the novel trouble-free type of granule of this invention.

In the manufacture of colored coated granules of this invention, a suitably pervious or impervious material is crushed to a particle size between approximately 10 and 35 mesh for use as the base granule to receive a color coating. Non-porous rocks or minerals, such as argillite or greystone (such as found in large greystone deposits located about five miles north of Wausau, Wisconsin), greenstone, certain granites, etc., are preferred materials, but other siliceous mineral materials such as trap rocks and slates may also be used.

After crushing the mineral material to a desired particle size, e.g., so as to pass a 10 mesh screen and be retained on a 35 mesh screen, the granules are heated to a temperature between approximately 90° to 180° F., usually 160° F., mixed with an inorganic silicate binder suspension and a pigment in a suitable mixer, such as an ordinary concrete mixer or other tumbling barrel type of mixer, and dried with a minimum of agitation as, for example, in a rotary kiln at a temperature above 250° F. but below 600° F., preferably about 400° F., to more completely dehydrate the silicate coating to a rigid, abrasion-resistant state. The siliceous portion of the alkali silicate binder is insolubilized during drying and formed into a matrix, but the sodium or other alkali flux portion remains in the dried coating as a soluble residue.

As stated above, drying is accomplished at low temperatures so that the pigment will not be altered undesirably. Ultramarine blue, red iron oxide, yellow iron oxide, chromium oxide, etc. are but examples of pigments which may be employed.

After the drying step, the coated granule is subjected to an ion exchange medium. Usually this entails a transfer of the dried granules from the drying rotary kiln to a rotary cooler where an aqueous slurry of a particulate ion exchange material is applied to them. The particulate ion exchange material and water may be applied separately to the granules, but for convenience I prefer to use a slurry, which I have found to be more easily handled. Since the granules from the drying step are at a temperature of approximately 400° F. when they are introduced to the rotary cooler and gradually moved therethrough, and since the slurry of ion exchange material, suitably at room temperature, is preferably poured upon them near the point of their entrance into the rotary cooler, the resulting temperature at which ion exchange takes place is quite high and the water necessary for the exchange reaction is quickly evaporated, leaving the granules at a somewhat reduced temperature, i.e., with a residual heat on the order of approximately 150°–200° F., and in a substantially dry condition.

In the preferred embodiment of this invention, therefore, ion exchange takes place within a relatively short period of time, i.e., on the order of two to three minutes but up to approximately five minutes. In view of the solid nature of the material to be removed by ion exchange, its relative inaccessibility in the pores of the insolubilized siliceous matrix, the constant escaping of water in the form of steam, and the high temperatures for the reaction, it is surprising that any ion exchange at all is accomplished. Despite these extraordinary conditions, the soluble constituent, i.e., the alkali portion, of the granules is drastically reduced. It is possible, although I do not wish to be bound by this explanation, that the steam formed as the slurry strikes the hot granules, and the steam formed later as the temperature of the water of the slurry is raised by further contact with the hot granules, functions in part as the vehicle of ion exchange. I believe this to be true, inasmuch as it is difficult to account for the drastic reduction in soluble salts in the coatings of the granules within the short time (a period of only a few minutes but possibly longer) liquid water is present to act as the ion exchange vehicle. The actual exchange involves the alkali flux ions of the coating and the hydrogen ions of the ion exchange material. The exchanger is thereby converted from a hydrogen to an alkali form.

A suitable rotary cooler for ion exchange is one equipped with lifter flights, i.e., with sections of angle irons oriented substantially longitudinally along the inner cylindrical surface of the cooler. The cooler may be tilted somewhat from a true horizontal position so as to facilitate the movement of granules gradually therethrough. Preferably, the lifter flights which are situated in the first portion (i.e., four or five feet) of the cooler have a relatively small flanged portion compared to those lifter flights in the later portion thereof. Suitably, conventional rotary coolers equipped with lifter flights, as well known in this art, may be employed as the apparatus for the ion exchange step in my process. The length of the cooler may vary considerably, but I have found that a length of approximately 20 feet allows sufficient time for the ion exchange step as well as for evaporation of most of the water of the ion exchange slurry before the granules and particulate of the ion exchange material are ejected from the cooler in a substantially dry state. Preferably the granules will travel through the cooler in approximately ten minutes but this may vary considerably.

As is well known in this art, the cooler should be rotated at a rate just sufficient to agitate the granules without cracking their coatings. Since a steamy atmosphere is instantly created, not only above the hot granules but in the mass thereof, as the exchange slurry is sprayed upon the bed of granules, this slight agitation of the granules in the cooler, caused by a slow rotation of the cooler, serves the desirable function of mixing the granules and ion exchange particulate together as well as of allowing steam to escape from within the mass of the granules and leave them in a substantially dry condition. Some agitation is necessary to place the wet ion exchange particles in intimate contact with the granule surfaces and thereby effect a more complete exchange of ions. A slight countercurrent movement of air through the cooler may also be employed advantageously to remove the steam and leave the granules with only a trace of water.

After being ejected from the rotary cooler, the granules are separated from the particulate of the cation exchange material by screening, suitably on a vibrating or oscillating screen. By using a preferred particulate size between approximately 50 and 100 mesh for the ion exchange material, separation of the ion exchange material, from the coated granules, which are of a size on the order of 10 to 35 mesh, is easily accomplished. It will be apparent that an ion exchange material of particulate size larger than 10 mesh may also suitably be employed insofar as the requirement for a size differential between the coated granules and ion exchange material is concerned.

Particle sizes smaller than between approximately 50 to 100 mesh for the cation exchange material may be used successfully to effect ion exchange, and in fact, may be expected to facilitate slightly more rapid ion exchange under the conditions of treatment delineated herein. However, the use of smaller sizes also gives trouble in subsequent steps of the process and suffers other disadvantages. Sizes for the particulate cation exchange material on the order of approximately 150 mesh, or smaller, cannot easily be removed from the coated granules by mere vibratory screening, will leave deposits in the nature of noncontinuous films on the granule surfaces and interfere with color hues, as well as interfere with the effectiveness of any pickling step. It will be apparent that if methods of separation other than screening are employed, the requirement for a size differential between the granules and ion exchange particulate may disappear.

I may employ any suitable ion exchange material in my process which is capable of furnishing a large number of free reactive hydrogen or related ions to enter into the exchange process. Inorganic base ion exchangers as well as organic base ion exchangers, preferably in particulate size according to the principle set forth above, have been found to accomplish successfully the removal of the cations of the soluble alkali flux constituent in the binder matrix on the coated granules. In the examples hereof, however, I have set forth cation exchange materials which perform my process in an eminently satisfactory manner. These may be noted to possess a high capacity for alkali metal ions. In addition they are easily regenerated to their acid or hydrogen ion supplying form by a simple method, such as by acid treatment. It will of course be evident that the ion exchanger selected must be one which possesses a capacity for the cations of the inorganic flux material intended to be removed from the coating of the granule. The particular ion exchange material used should also be selected with a consideration of the stability of the mass of the ion exchange material under the extremes of heat and alkalinity such as are encountered in my process. In the preferred embodiment hereof, the body of the exchanger, i.e., that portion holding loosely the reactive hydrogen or related ions, must be stable at temperatures up to approximately 350° F. and even higher. By stability is meant that the ion exchange particulate must not become a fluid mass or degrade in such a manner as to cause the formation of a deposit upon the coating of the granules. The body of the ion exchange particulate must also be stable and insoluble in highly alkaline solution, i.e., those up to approximately pH 12.

The time required for suitable ion exchange following the teachings herein will vary, depending upon a plurality of factors, but to attain the most pronounced advantages of this invention the ion exchange material and the conditions of treatment should be so adjusted as to permit a suitable reduction of soluble salts in the coating of the granules within the time available according to the preferred procedure hereof. Longer periods of treatment of course are possible. Some factors which affect the time required for suitable treatment are the capacity of the cation exchange material, its rate of exchange ability, the particular flux and quantity thereof present in the binder matrix, the temperature of the treatment, the size of the particles of the cation exchanger and the like. I desire to select cation exchange materials which have a high rate and capacity of exchange ability for alkali metal ions, and are stable under the conditions of treatment encountered in the preferred embodiment hereof. Ion exchange materials of a poor capacity are undesirable inasmuch as they must be in large amounts to obtain the required results. While excessive amounts of particulate ion exchange materials may be employed, an amount over approximately 100 pounds of the ion exchanger per ton of granules renders the process uneconomical and creates difficulties relative to handling such a volume of material.

I have found that a minimum of air flow through the rotary cooler in which ion exchange is taking place gives a surprising increase in the speed and completeness of ion exchange reaction. I may, however, with slightly less satisfactory results, pass a large volume of air through the rotary tumbler, preferably in a countercurrent direction to the movement of the granules and ion exchange particulate therethrough.

While the temperatures for the cation exchange reaction according to the preferred embodiment of this invention vary from those at approximately room temperature to those up to the temperature of the hot granules, slightly higher temperatures may also be used satisfactorily. Alternative methods of accomplishing the results hereof, such as by using an autoclave, will lead to higher temperatures which, of course, must be closely regulated to avoid alteration of sensitive pigment hues.

After the granules are separated from the particulate of ion exchange material, I have found that a pickling step, which has heretofore been used to lower the pH of highly basic coatings on granules, may be employed advantageously to impart the property of unusually tenacious asphalt adhesion to the coated granules hereof. If the ion exchange has been accomplished expeditiously, the granules will contain a certain residual heat, which is sufficient for them to be responsive to the type of pickling treatment herein described.

To accomplish pickling, the granules separated from the ion exchange particulate are fed into another rotary unit, hereinafter referred to as a rotary reactor. Such a reactor is one suitably equipped with lifter flights and rotating at a slow rate as aforedescribed in relation to the rotary cooler for ion exchange. Near the point of introduction of the granules to the rotary reactor they are sprayed or otherwise treated with a small quantity of a pickling solution, preferably one containing aluminum ions, for I have found that such ions will promote a property of tenacious asphalt adhesion in the granules. I may, however, employ other pickling solutions, e.g., ammonium chloride, aluminum chloride and ammonium chloride, hydrochloric acid, and the like. The water of the pickle is evaporated by aeration as the granules are advanced through the rotary reactor. The volume of air passed through the reactor is quite substantial inasmuch as it is desired to obtain a discharge of dry, cool granules from the unit. The amount of cooling effected during aeration of the pickled granules will leave them at a temperature only slightly above room temperature. If the temperature of the granules during ion exchange dropped below approximately 150° F., I have found it to be desirable to heat the granules either prior to pickling or after they have been sprayed with the pickle solution.

The granule property of adhering to asphalt is surprisingly improved by pickling, especially by pickling with solutions containing aluminum ions. A small quantity of pickle on the order of less than one pound of pickle solids per ton of granules is effective. It is paradoxical that an inorganic normally organophobic aluminum ion should promote a property of tenacious asphalt adhesion in the granules treated as set forth herein; nevertheless, pickling alone, without ion exchange, fails to promote any improvement in the property of asphalt adhesion. Likewise, if the ion exchange material is not removed from the granules prior to pickling, the desired results are not obtained. If the steps of pickling and ion exchange are reversed in my process, the improved property of asphalt adhesion is lost, as well as the improved property of lack of blooming. Pickling, especially pickling with aluminum ion solutions, also improves the ability of the granules to accept organophilic substances such as asphalt when wet with water.

The amount of active ingredient in my pickle treatment is substantially less than previously required, i.e., on the order of less than one-third that previously required in pickling treatments which have been ineffective to produce the results I obtain. There are other methods of imparting an improvement in asphalt adhesion properties to granules subjected to ion exchange in accordance with this invention, however, and I do not wish to be limited in this respect to pickling exclusively, although I realize that other methods may not produce an improvement in my granules as outstanding as that accomplished by the preferred aluminum ion pickling hereof. The granules may now be treated with small quantities of petroleum oil, paraffin oil, linseed oil, etc., or be given any other granule treatment known to the roofing art.

To more fully illustrate but not limit the invention hereof the following specific examples are offered:

*Example 1*

| | Pounds |
|---|---|
| Granules | 2000 |
| Chromium oxide | 12.0 |
| Water | 4.0 |
| Sodium silicate solution, 40–42% solids, 47° Baumé (soda to silicate ratio of 1:2.84) | 30.0 |
| Sulfonated cation exchange material | 32.0 |
| Water | 120.0 |

A fluid film-forming slurry of the chromium oxide, sodium silicate and 4 pounds of water was first made and coated on the granules in a suitable mixer such as a tumbling-barrel type. The granules were fed to the mixer at about 110° F. and the mixing continued until the granules were completely and uniformly coated with the pigment-silicate suspension. Air was circulated through the mixer to partially dry the granules; the partial drying may take five to ten minutes. The granules were then transferred to a rotary kiln and heated to a temperature of 400° F., which temperature is normally maintained for from 5 to 20 minutes depending on the size of the kiln and other factors, to more completely dehydrate the silicate coating to an abrasion-resistant rigid state. The drying action in the rotary kiln should be accomplished with the least amount of agitation possible to facilitate the formation of a dense, tough, surface coating. The granules were thereafter subjected to ion exchange.

The ion exchange material employed here was a sulfonated styrene-divinyl benzene copolymer formed by reacting a copolymer consisting of 92 parts styrene and 8 parts divinyl benzene with an excess, e.g. 180 parts, of chlorosulphonic acid for three minutes at the reflux temperature of the mass during polymerization and then for about 50 hours at room temperature. The resinous product was washed with a large volume of water to destroy the excess of chlorosulphonic acid and any acid chloride which might have formed. The filtered and dried resulting product has a large number of sulphonic acid groups substituted into each aryl nucleus. This resin is but one of a large group of sulfonated polyvinyl aryl compounds which have proved eminently suitable in this process, and which are generally known as sulfonated polymerizates of polyvinyl aryl resins. Such resins may be obtained commercially under the trade name "Dowex" from the Dow Chemical Company.

From the rotary drying kiln the hot granules, at 400° F., were fed directly into a rotary cooler. The rotary cooler may take the form of a rotary tube equipped with lifter flights as described above. Thirty-two pounds of the ion exchange material of this example ground to a particle size on the order of 50 mesh were mixed with 120 pounds of water at room temperature to form a slurry, which was then poured over the hot granules at a point near their entrance into the rotary cooler. The heat of the granules caused the water of the slurry to steam off in approximately two or three minutes. Agitation of the granules by a slow rotation of the cooler served to expose all surfaces of the coating of the granules to the action of the ion exchange medium, as well as to facilitate the escape of steam entrapped in the bed of granules. A low volume countercurrent flow of air through the cooler served to remove the steam from the cooler and leave the granules in a substantially dry state at the point of discharge. Separation of the granules from the ion exchange particulate was accomplished by screening the mass on a 35 mesh vibrating or oscillating screen.

At this point, the granules of this example were oiled with a petroleum oil for the purpose of increasing their adhesion to asphalt. Other materials may be used for this purpose.

The resulting granules contained 0.52 pound of soluble salts per ton of granules, and were substantially neutral in pH. Under the most severe laboratory tests results were obtained which indicated that in actual use under the most severe conditions conducive to blooming these granules would be bloom free.

While these granules were non-blooming they were not especially superior in their property of asphalt adhesion. The remaining examples illustrate granules which have the above improved characteristics as well as a pronounced improvement in asphalt adhesion over prior art granules.

*Example 2*

| | Pounds |
|---|---|
| Granules | 2000 |
| Chromium oxide | 9 |
| Yellow iron oxide (hydrate) | 3.5 |
| Carbon black | .7 |
| Phthalocyanine green paste (20% or 2.2 lbs. solids) | 11.0 |
| Sodium silicate solution, 40-42% solids, 47° Baumé (soda to silicate ratio of 1:2.84) | 31 |
| Sulfonated cation-exchange resin of Ex. 1 | 14 |
| Water | 110 |
| Aluminum chloride pickle solution (0.5 pound solids) | 40 |

The chromium oxide, yellow iron oxide, phthalocyanine paste, and sodium silicate solution were mixed together to form a fluid film-forming slurry and coated on the granules in a rotary mixer, e.g., a concrete mixer. Granules were coated and thereafter were dried at 375° F. in a manner such as set forth in Example 1.

Directly from the rotary drying kiln the coated granules were transferred into a rotary cooler, as in Example 1, where a slurry of 14 pounds of the cation exchange resin of Example 1 and 110 pounds of water was added by spraying. A mild countercurrent of air was passed through the rotating cooler. The granules discharged from the cooler were screened according to the preceding example, and although their residual heat at this point was sufficient for the partial pickling step of this invention, they were heated to 250° F. before spraying them with 40 pounds of an aqueous solution containing 0.5 pound of aluminum chloride as they were introduced into a rotary reactor unit having a countercurrent flow of air therethrough. In the case of low temperature pickling i.e., pickling the granules at the temperature at which they are discharged from the rotary cooler in which ion exchange is accomplished, more concentrated pickling solutions are preferably employed, e.g., those on the order of 3% solids. Even more concentrated solutions may be employed. The granules of this example were found to have less than 1 pound of soluble salts per ton remaining. They were oiled with five pounds of petroleum oil and exhibited the outstanding property of asphalt adhesion of this invention.

*Example 3*

| | Pounds |
|---|---|
| Granules | 2000 |
| Chromium oxide | 8.8 |
| Green phthalocyanine paste (20% solids) | 10 |
| Yellow iron oxide (hydrated) | 1.0 |
| Water | 4.0 |
| Sodium silicate solution, 47° Baumé (soda to silicate ratio of 1:2.84) | 30.0 |
| Carboxylic cation-exchange resin | 11 |
| Water | 116 |
| Aluminum chloride pickle solution (0.5 pound solids) | 20 |

The granules were coated with a mixture of the chromium oxide, green phthalocyanine paste, yellow iron oxide, four pounds of water, and the sodium silicate solution, and were thereafter dried at 400° F. as in Example 1. From the rotary drying kiln the hot granules were transferred directly to a rotary cooler where a slurry of cation exchange resin of particle size between 50-100 mesh in 116 pounds of water was poured upon them.

The particular carboxylic cation exchange resin employed was a copolymer of 30 parts divinyl benzene and 70 parts acrylic acid. The resin was prepared by mixing a small amount of a peroxide, e.g., 1% of benzoyl peroxide with the monomeric mixture and allowed to stand for 48 hours at room temperature, followed by heating at 40° C. for a day, and then raising the temperature to 60° C. for a day and finally to 80° C. for a day. Thereafter the resin was washed, filtered, ground to a particle size between approximately 50 and 100 mesh, and formed into a slurry at room temperature. Other carboxylic cation exchange resins, e.g., resinous copolymers of diallyl itaconate and methacrylic acid; diallyl maleate, vinyl acetate and methacrylic acid, etc., may be employed in place of the specific one described. Such resins may be obtained commercially under the trade name "Amberlite" from the Rohm and Haas Co.

The discharged granules were screened and introduced into a rotary reactor, at the entrance point of which they were sprayed with a mist of the aluminum chloride pickel solution (0.5 pound aluminum chloride in 40 pounds of water). The residual temperature of the granules at the point of spraying, e.g., on the order of 150° F., was sufficient to permit rapid drying action after spraying. Cooling and drying of the granules in the rotary reactor may be suitably accomplished by passing a large volume of air through the unit as the granules are agitated by the rotation thereof. The granules were then oiled but may be given any treatment known to the roofing art.

The granules of this example had a soluble salt content of less than one pound per ton of granules, were substantially neutral in pH, were bloom-free, and in addition possessed surprisingly tenacious adhesion to asphalt.

*Example 4*

| | Pounds |
|---|---|
| Granules | 2000 |
| Chromium oxide | 9 |
| Yellow iron oxide (hydrate) | 3.5 |
| Carbon black | 0.7 |
| Phthalocyanine green (20% or 2.2 lbs. solids) | 11 |
| Sodium silicate, 40–42% solids, 47° Baumé (sodium to silicon ratio 1:1.84) | 31 |
| Sulfonated coal cation exchanger | 40 |
| Water | 116 |
| Aluminum chloride pickle solution (0.6 lb. solids) | 50 |

Granules coated with a slurry of chromium oxide, yellow iron oxide, carbon black, phthalocyanine green, and sodium silicate solution were dried, e.g., as in Example 1, at a temperature of 375° F. Directly from drying they were transferred to a rotary cooler and sprayed with a slurry of 40 pounds of the cation exchanger of this example, in a particle size of about 50 to 100 mesh, and 116 pounds of water.

The exchanger employed in this example was sulfated or sulfonated bituminous coal prepared by mixing 100 parts by weight of bituminous coal, in particle size of 100 mesh, with 300 parts by weight of 20% fuming sulfuric acid, washing the product, neutralizing it with a dilute sodium carbonate solution, and drying it. The product was then heated at about 130° C. for three hours under about 2.7 atmospheres pressure with about twice its weight of a solution of 30% sodium pyrosulphite, washed and dried. A suitable commercial, sulfite treated, sulfated or sulfonated coal cation exchanger is "Zeo-Karb-H" currently available from The Permutit Company.

The granules from the rotary cooler were screened as in Example 1, heated in a rotary kiln to a temperature of 250° F., transferred to a rotary reactor unit and sprayed with a mist of a solution of 0.6 pound of AlCl₃ in 50 pounds of water. A large volume of air was passed through the second rotary unit to dry the granules.

Examples 2, 3 and 4 illustrate substantially the minimum quantities of exchanger and water usable. These amounts may, of course, be varied considerably, i.e., increased to at least double, and even triple those set forth; however, with increases in the quantity of resin and water, or increases in quantity of resin without increases in the quantity of water, or only a slight increase thereof, or with an increase in the quantity of water out of proportion to the increase in the quantity of the exchanger, there arise additional problems in processing, e.g., loss of temperatures, and commensurate increases in processing costs.

A simple test will demonstrate the improved asphalt adhesion of my granules. For comparison purposes, equal quantities of granules prepared by my process and those prepared by a similar process omitting the step of ion exchange were placed in two separate beakers and immersed in water. An equal quantity of soft flux asphalt, or the like was added to each. A mixture of hard asphalt and a hydrocarbon oil, such as a mixture of 135 parts of saturating asphalt of 140° F. melting point (ball and ring) with 100 parts of slate oil may be used. The asphalt and granules in each beaker were stirred equally and the granules inspected to determine the extent of coverage with asphalt. Those granules of this invention which had been pickled with aluminum ions exhibited a coverage approximately twice as great as those prepared without the ion exchange step but with a prior art aluminum ion pickling step. Likewise, the granules hereof have exhibited only approximately one-half the displacement from an asphalt backing that pickled granules not subjected to ion exchange have exhibited.

By the process hereof coated granules of the type herein described are obtained with a soluble constituent content of less than two pounds per ton of granules. I know of no other low temperature method whereby such results may be obtained.

The above will enable those skilled in the art to practice this invention, which is not to be limited except as set forth in the appended claims.

What I claim is:

1. A process of making colored coated roofing granules which contain in their coating a silicate binder material, said process including, in sequence, the steps of drying at a raised temperature an alkali silicate coating on said granules to a rigid abrasion-resistant state, contacting in ion exchange relationship the coated granules with discrete stable solid water-insoluble cation exchange particles having a size greater than approximately 150 mesh and an aqueous vehicle without coating said discrete cation exchange particles as a film upon the surface of said coated granules, said contact being conducted for a brief period of time and at a temperature surfficient to effect substantial removal of the alkali flux constituent from the silicate matrix of the coating, and separating the granules from the discrete cation exchange particles.

2. A process of making colored coated roofing granules which contain in their coating a silicate binder material, said process including the steps of drying at a raised temperature an alkali silicate coating on said granules to a rigid abrasion-resistant state, briefly contacting in ion exchange relationship the coated granules with discrete stable solid water-insoluble cation exchange particles having a size greater than approximately 150 mesh and an aqueous vehicle for ion exchange without coating said discrete cation exchange particles as a film upon the surface of said coated granules, rapidly vaporizing a substantial portion of said aqueous vehicle sufficient to leave said granules and cation exchange particles in a substantially dry condition, and separating the granules from the discrete cation exchange particles.

3. A process of making colored coated roofing granules which contain in their coating a silicate binder material, said process including the steps of drying at a raised temperature an alkali silicate coating on said granules to a rigid abrasion-resistant state, briefly contacting in ion exchange relationship the coated granules with discrete stable solid water-insoluble cation exchange particles having a size greater than approximately 150 mesh and an aqueous vehicle for ion exchange without coating said discrete cation exchange particles as a film upon the surface of said coated granules, rapidly vaporizing a substantial portion of said aqueous vehicle sufficient to leave said granules and cation exchange particles in a substantially dry condition, separating the granules from the cation exchange particles and applying to the surface of the granules a small quantity of an aqueous pickling solution containing aluminum ions.

4. A process of making bloom-free colored coated roofing granules, including, in sequence, the steps of coating the granules with a composition comprising a pigment and an alkali silicate binder, drying the coating to a rigid, abrasion-resistant state at a temperature below 600° F., mixing the granules with discrete stable solid water-insoluble cation exchange particles having a size greater than approximately 150 mesh and an aqueous vehicle without coating said discrete cation exchange particles as a film upon the surface of said coated granules, said mixing being conducted for a brief period of time and at a temperature sufficient to effect substantial removal of soluble alkali constituents from the coating, and separating the thus treated granules from the discrete cation exchange particles.

5. A process of making colored coated mineral granules comprising, in sequence, coating the granules with a composition comprising an alkali silicate binder, drying the coating on the granules at a temperature below 600° F. to a rigid, abrasion-resistant state, briefly contacting in ion exchange relationship said granules with discrete stable solid water-insoluble cation exchange particles having a size greater than approximately 150 mesh and an aqueous vehicle without coating said discrete cation exchange particles as a film upon the surface of said coated granules, separating the granules from the discrete cation exchange particles, and applying to the surface of the granules a small quantity of an aqueous pickling solution containing aluminum ions.

6. Colored coated roofing granules characterized by a soluble constituent content of less than two pounds per ton and prepared in accordance with the process of claim 5.

7. A process of making bloom-free, color coated mineral granules comprising coating mineral base granules with a composition comprising a pigment and an alkali silicate binder, drying said coating to a rigid, abrasion-resistant state at a temperature below 600° F., pouring upon said granules a slurry of discrete stable solid water-insoluble cation exchange particles having a particle size greater than 150 mesh and water, said cation exchange particles and granules further being of different average particle sizes, mixing the granules and said slurry under conditions of heat sufficient to vaporize the water of said slurry in a brief period of time and leave the granules in a substantially dry condition essentially free of any film coating of said discrete cation exchange particles, separating said granules from the cation exchange particles, and applying to the surface of said granules a small quantity of a solution containing a pickling ingredient.

8. In a process for making weather-resistant coated granules, the step of briefly contacting in ion exchange relationship granules upon which an alkali silicate coating has been dried to a rigid, abrasion-resistant state with stable solid cation exchange resin material of such size as to be retained on a screen of approximately 150 mesh and a vehicle for ion exchange without coating said cation exchange resin as a film upon the surface of said coated granules, whereby a substantial portion of the alkali constituent is removed from the alkali silicate coating of said granules.

9. In a process for making bloom-free, colored coated mineral granules, the steps of drying at a raised temperature an alkali silicate coating upon said granules to a rigid, abrasion-resistant state, briefly treating said granules after the alkali silicate coating thereon has been dried with a slurry of discrete stable solid cation exchange resin particles of such size as to be retained on a screen of approximately 150 mesh and water without coating said discrete cation exchange particles as a film upon the surface of said coated granules, and separating the treated granules from the resin particles.

10. In a process for making bloom-free, colored coated mineral granules which includes coating said mineral granules with an alkali silicate in a water suspension and drying said coating at a raised temperature below approximately 600° F. to a rigid, abrasion-resistant state, the step, subsequent to drying, of briefly contacting said coated granules in ion exchange relationship with a stable solid cation exchange resin material of such size as to be retained on a screen of approximately 150 mesh and an aqueous vehicle for ion exchange without coating said cation exchange resin as a film upon the surface of said coated granules.

11. In a process for making weather-resistant coated granules the step of briefly contacting in ion exchange relationship (a) granules upon which an alkali silicate coating has been dried to a rigid, abrasion-resistant state, with (b) discrete stable solid water-insoluble cation exchange particles having a size greater than approximately 150 mesh and (c) a vehicle for ion exchange, without coating said discrete cation exchange particles as a film upon the surface of said alkali silicate coated granules, whereby a substantial portion of the alkali constituent of the coating of said granules is removed therefrom.

12. In a process for making weather-resistant coated granules the step of mixing (a) granules upon which an alkali silicate coating has been dried to a rigid, abrasion-resistant state with (b) discrete stable solid water-insoluble cation exchange particles having a particle size greater than 150 mesh and (c) an aqueous ion exchange vehicle without coating said discrete cation exchange particles as a film upon the surface of said alkali silicate coated granules, said mixing being conducted for a brief period of time and at a temperature sufficient to remove a substantial portion of the soluble alkali constituent of the alkali silicate coating of said granules.

13. In a process for making bloom-free coated mineral granules which contain in their coating a silicate binder material, the step of briefly contacting in ion exchange relationship (a) the granules after an alkali silicate coating thereon has been dried to a rigid, abrasion-resistant state with (b) discrete stable solid water-insoluble cation exchange particles having a size greater than approximately 150 mesh and (c) water without coating said discrete cation exchange particles as a film upon the surface of said alkali silicate coated granules, said contact taking place under conditions of heat sufficient to vaporize said water and leave said granules in a substantially dry condition essentially free of any film coating of said discrete cation exchange particles.

14. In a process for making bloom-free coated mineral granules which contain in their coating a silicate binder material, the step of mixing (a) the granules after an alkali silicate coating thereon is dried at a raised temperature to a rigid abrasion-resistant state with (b) discrete stable solid water-insoluble cation exchange particles having a size greater than approximately 150 mesh and (c) an aqueous vehicle without coating said discrete cation exchange particles as a film upon the surface of said coated granules, said mixing being conducted at a temperature above room temperature and below that at which the coating on the granules was dried, and for a brief period of time sufficient to remove a substantial portion of the soluble alkali constituents of the binder material, leaving said granules essentially free of any film coating of said discrete cation exchange particles.

(References on following page)

References Cited in the file of this patent

UNITED STATES PATENTS

| | | |
|---|---|---|
| 1,952,057 | Crawford et al. | Mar. 27, 1934 |
| 2,062,080 | Wright | Nov. 24, 1936 |
| 2,168,593 | Veazey | Aug. 8, 1939 |
| 2,285,750 | Swain | June 9, 1942 |
| 2,340,110 | D'Alelio | Jan. 25, 1944 |
| 2,408,207 | Garrison et al. | Sept. 24, 1946 |
| 2,455,719 | Weyl et al. | Dec. 7, 1948 |
| 2,457,971 | Voorhees | Jan. 4, 1949 |
| 2,460,516 | Luaces | Feb. 1, 1949 |
| 2,591,149 | Grove | Apr. 1, 1952 |

OTHER REFERENCES

Myers et al.: "Synthetic Resins as Exchange Adsorbents," Ind. and Eng., Chem., vol. 33, No. 6, pages 697 to 706.